US009007692B2

(12) United States Patent
Shiraishi

(10) Patent No.: US 9,007,692 B2
(45) Date of Patent: Apr. 14, 2015

(54) LENS ARRAY AND IMAGE FORMING APPARATUS USING THE LENS ARRAY

(71) Applicant: Toshiba Tec Kabushiki Kaisha, Tokyo (JP)

(72) Inventor: Takashi Shiraishi, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/650,592

(22) Filed: Oct. 12, 2012

(65) Prior Publication Data
US 2013/0100506 A1 Apr. 25, 2013

(30) Foreign Application Priority Data

Oct. 19, 2011 (JP) .................................. 2011-229868

(51) Int. Cl.
G02B 27/10 (2006.01)
H04N 1/04 (2006.01)
G02B 27/12 (2006.01)
G02B 3/00 (2006.01)

(52) U.S. Cl.
CPC ............... G02B 27/12 (2013.01); H04N 1/04 (2013.01); G02B 3/0031 (2013.01)

(58) Field of Classification Search
CPC .... G02B 3/0062; G02B 3/0068; G02B 3/005; G02B 27/0018; G02B 27/0961; G02B 27/2214; G02B 3/0056; H04N 1/0318; H04N 1/0312; H04N 2201/03112; H04N 2201/03141; H04N 2201/03145; H04N 13/0404; H04N 13/0454; B41J 2/451
USPC ............... 359/201.1, 619, 621–623; 358/474, 358/494, 496–497
See application file for complete search history.

(56) References Cited

U.S. PATENT DOCUMENTS 6,366,408 B1 4/2002 Kittaka et al.
8,780,157 B2 * 7/2014 Shiraishi ........................ 347/244
2010/0315718 A1* 12/2010 Nagata ........................... 359/622

FOREIGN PATENT DOCUMENTS

JP 2000-221442 8/2000
JP 2000-292739 10/2000
JP 2002-062407 2/2002
JP 2008-083576 4/2008
JP 2009-223186 10/2009

OTHER PUBLICATIONS

Japanese Office Action for Japanese Patent Application No. 2011-229868 mailed on Oct. 1, 2013.

* cited by examiner

*Primary Examiner* — James Phan
(74) *Attorney, Agent, or Firm* — Amin, Turocy & Watson, LLP

(57) ABSTRACT

According to one embodiment, a lens array includes a first lens and a second lens. The first lens includes a plurality of lens elements arrayed in a main scanning direction and configured to condense, with an emission surface, light made incident on an incident surface from an object point. The second lens includes a plurality of lens elements arrayed in the main scanning direction. The lens elements condense again, with an emission surface, light made incident on an incident surface. When the light from the object point is made incident on the incident surface of the first lens and emitted from the emission surface of the second lens, a distance between two points of emission positions on outermost sides on the emission surface of the second lens is substantially the same in the main scanning direction and a sub-scanning direction.

20 Claims, 9 Drawing Sheets

LENS ARRAY AND IMAGE FORMING APPARATUS USING THE LENS ARRAY

CROSS-REFERENCE TO RELATED APPLICATIONS

This application is based upon and claims the benefit of priority from the prior Japanese Patent Application No. 2011-229868, filed on 19 Oct. 2011, the entire contents of which are incorporated herein by reference.

FIELD

Embodiments described herein relate generally to a lens array and an image forming apparatus using the lens array.

BACKGROUND

In the past, a reading apparatus such as a scanner or an image forming apparatus such as a printer, a copying machine, or a multi-function peripheral (MFP) reads an image of an original document by focusing the image of the original document on an image sensor using a light-emitting device such as an LED and a lens array in which a plurality of lenses are arrayed. Further, the apparatus focuses, using the light emitting device such as the LED and the lens array, a ray from the LED on a photoconductive drum via the lens array and forms (exposes) an image on the photoconductive drum. As the lens array, there is a lens array in which a plurality of lenses and apertures are combined.

In a lens array arranged one-dimensionally, the depth of focus and the depth of field in a sub-scanning direction are large compared with those in a main scanning direction. If an object plane or an image plane deviates from a design value, blurring conditions are different in the main scanning direction and the sub-scanning direction. This causes a sense of discomfort for a user who looks at a scan image in a CIS including the lens array and an output image in an LED scanning head.

A technique is disclosed for improving MFT and a light amount and suppressing fluctuation due to a place and the like by, in a lens array in which lens surfaces are arranged in a row in the main scanning direction, setting the diameter of the lens surfaces in the sub-scanning direction larger than a pitch among lens elements in the main scanning direction. However, this technique does not take into account the balance of characteristics (resolution) that should be kept if the object plane or the image plane deviates from the design value. Therefore, the same problem occurs in the scan image in the CIS including the lens array and the output image in the LED scanning head.

DETAILED DESCRIPTION

In general, according to one embodiment, a lens array includes a first lens and a second lens. The first lens includes a plurality of lens elements arrayed in a row in a main scanning direction orthogonal to an optical axis and configured to condense, with an emission surface, light made incident on an incident surface from an object point. The second lens is formed in the same shape as the first lens. The second lens includes a plurality of lens elements arrayed in a row in the main scanning direction orthogonal to the optical axis. An incident surface of the lens elements is arranged further downstream on an optical path than a position where the light is condensed by the lens elements of the first lens. The lens elements condense again, with an emission surface, light made incident on the incident surface.

The width in a sub-scanning direction of the lens elements arranged on the incident surface of the first lens and the emission surface of the second lens is larger than a lens pitch in the main scanning direction. When light from the object point is made incident on the incident surface of the first lens and emitted from the emission surface of the second lens, a distance between two points of emission positions on outermost sides on the emission surface of the second lens is substantially the same in the main scanning direction and the sub-scanning direction.

First Embodiment

Figure 1:
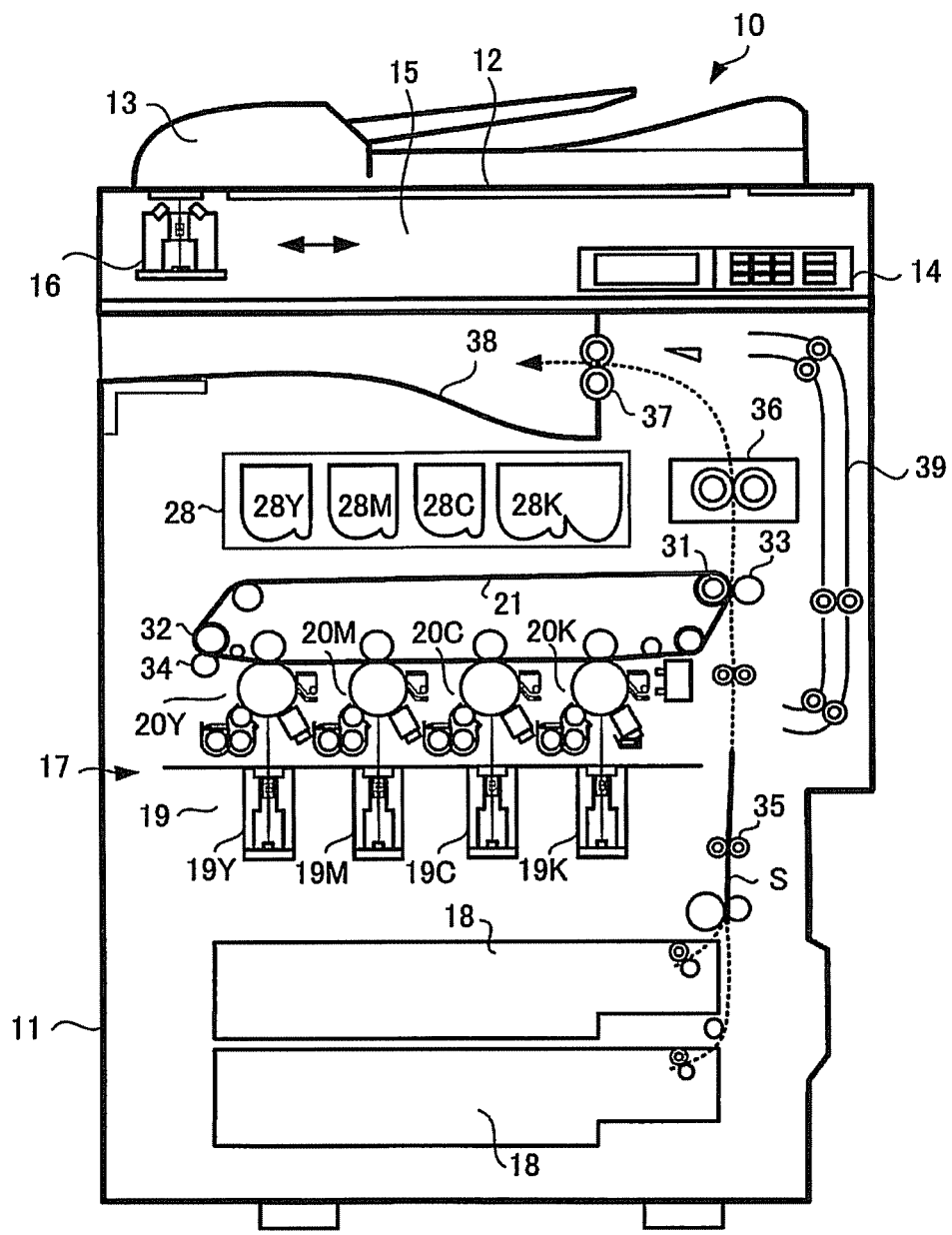
FIG. 1 is a configuration diagram of an image forming apparatus in a first embodiment.

FIG. 1 is a configuration diagram of an image forming apparatus according to a first embodiment. In FIG. 1, an image forming apparatus 10 is, for example, a multi-function peripheral, which is a compound machine, a printer, or a copying machine. The MFP is explained as an example below.

A document table 12 of transparent glass is present in an upper part of a main body 11 of the MFP 10. An auto document feeder (ADF) 13 is openably and closably provided on the document table 12. An operation panel 14 is provided in the upper part of the main body 11. The operation panel 14 includes various keys and a display section of a touch panel type.

A scanner section 15, which is a reading device, is provided under the ADF 13 in the main body 11. The scanner section 15 reads an original document fed by the ADF 13 or an original document placed on the document table 12 and generates image data. The scanner section 15 includes a contact-type image sensor 16 (hereinafter simply referred to as image sensor). The image sensor 16 is arranged in a main scanning direction (the depth direction in FIG. 1).

In reading an image of the original document placed on the document table 12, the image sensor 16 reads the original document image line by line while moving along the document table 12. The image sensor 16 executes the image reading over the entire size of the original document to read one page of the original document. In reading an image of an original document fed by the ADF 13, the image sensor 16 is present in a fixed position (a position shown in the figure).

Further, the MFP 10 includes a printer section 17 in the center in the main body 11. The MFP 10 includes, in a lower part of the main body 11, a plurality of cassettes 18 that house sheets of various sizes. The printer section 17 includes photoconductive drums and includes, as an exposing device, a scanning head 19 including LEDs. The printer section 17 scans the photoconductive drums with beams from the scanning head 19 and generates images.

The printer section 17 processes the image data read by the scanner section 15 or image data created by a PC (Personal Computer) or the like and forms an image on a sheet (details are explained below). The printer section 17 is, for example, a color LED printer of a tandem system. The printer section 17 includes image forming sections 20Y, 20M, 20C, and 20K for respective colors of yellow (Y) magenta (M), cyan (C), and black (K). The image forming sections 20Y, 20M, 20C, and 20K are arranged in parallel from an upstream side to a downstream side on the lower side of an intermediate transfer belt 21. The scanning head 19 includes a plurality of scanning heads 19Y, 19M, 19C, and 19K corresponding to the image forming sections 20Y, 20M, 20C, and 20K.

Figure 2:
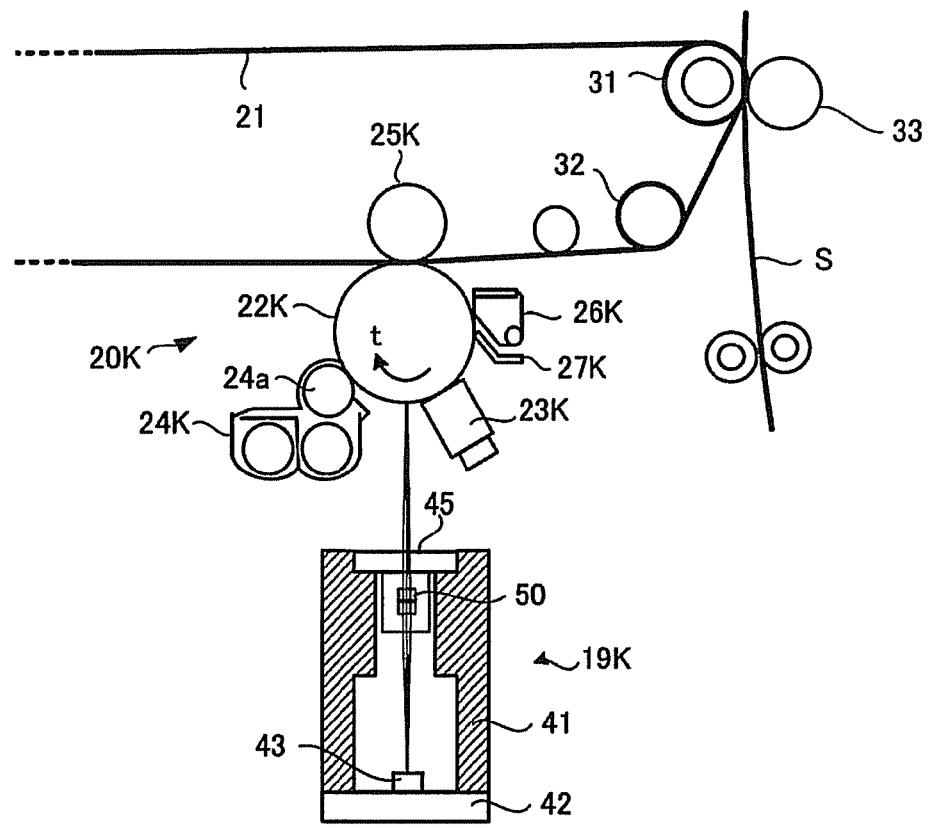
FIG. 2 is an enlarged configuration diagram of a part of an image forming section in the first embodiment.

FIG. 2 is an enlarged configuration diagram of the image forming section 20K among the image forming sections 20Y, 20M, 20C, and 20K. In the following explanation, since the image forming sections 20Y, 20M, 20C, and 20K have the same configuration, the image forming section 20K is explained as a representative.

As shown in FIG. 2, the image forming section 20K includes a photoconductive drum 22K, which is an image bearing member. An electrifying charger 23K, a developing device 24K, a primary transfer roller 25K, a cleaner 26K, a blade 27K, and the like are arranged along a rotating direction t around the photoconductive drum 22K. Light is irradiated on an exposing position of the photoconductive drum 22K from the scanning head 19K to form an electrostatic latent image on the photoconductive drum 22K.

The electrifying charger 23K of the image forming section 20K uniformly charges the entire surface of the photoconductive drum 22K. The developing device 24K supplies, with a developing roller 24a to which a developing bias is applied, a two-component developer containing a black toner and a carrier to the photoconductive drum 22K. The cleaner 26K removes a residual toner on the surface of the photoconductive drum 22K using the blade 27K.

As shown in FIG. 1, a toner cartridge 28 that supplies toners to the developing devices 24Y to 24K is provided above the image forming sections 20Y to 20K. The toner cartridge 28 includes toner cartridges for the respective colors of yellow (Y), magenta (M), cyan (C), and black (K).

The intermediate transfer belt 21 circularly moves. The intermediate transfer belt 21 is stretched and suspended by a driving roller 31 and a driven roller 32. The intermediate transfer belt 21 is opposed to and in contact with the photoconductive drums 22Y to 22K. A primary transfer voltage is applied to a position of the intermediate transfer belt 21 opposed to the photoconductive drum 22K by the primary transfer roller 25K to primarily transfer a toner image on the photoconductive drum 22K onto the intermediate transfer belt 21.

A secondary transfer roller 33 is arranged to be opposed to the driving roller 31 that stretches and suspends the intermediate transfer belt 21. When a sheet S passes between the driving roller 31 and the secondary transfer roller 33, a secondary transfer voltage is applied to the sheet S by the secondary transfer roller 33. The toner image on the intermediate transfer belt 21 is secondarily transferred onto the sheet S. A belt cleaner 34 is provided in the vicinity of the driven roller 32 of the intermediate transfer belt 21.

As shown in FIG. 1, conveying rollers 35 that convey the sheet S extracted from the paper feeding cassettes 18 are provided between the paper feeding cassettes 18 and the secondary transfer roller 33. A fixing device 36 is provided downstream of the secondary transfer roller 33. A conveying roller 37 is provided downstream of the fixing device 36. The conveying roller 37 discharges the sheet S to a paper discharge section 38.

Further, a reverse conveying path 39 is provided downstream of the fixing device 36. The reverse conveying path 39 reveres the sheet S and leads the sheet S in the direction of the secondary transfer roller 33. The reverse conveying path 39 is used when duplex printing is performed.

The configuration of the scanning head 19K is explained with reference to FIG. 2. The scanning head 19K is opposed to the photoconductive drum 22K and functions as an exposing device. The photoconductive drum 22K can rotate at a rotating speed set in advance and store charges on the surface thereof. Light from the scanning head 19K is irradiated on the photoconductive drum 22K to expose the photoconductive drum 22K and form an electrostatic latent image on the surface of the photoconductive drum 22K.

The scanning head 19K includes a lens array 50. The lens array 50 is supported by a holding member 41. The scanning head 19K includes a supporting body 42 in the bottom of the holding member 41. LEDs 43, which are light-emitting devices, are arranged on the supporting body 42. The LEDs 43 are linearly provided at an equal interval in the main scanning direction. A substrate (not shown) including a driver IC that controls light emission of the LEDs 43 is arranged on the supporting body 42. A detailed configuration of the lens array 50 is explained below.

The driver IC configures a control section. The driver IC generates a control signal for the scanning head 19K on the basis of image data and causes the LEDs 43 to emit light at a predetermined light amount according to the control signal. Rays emitted from the LEDs 43 are made incident on the lens array 50 and focused on the photoconductive drum 22K passing through the lens array 50. An image is formed on the photoconductive drum 22K. A cover glass 45 is attached to an upper part (on an emission side) of the scanning head 19K.

Figure 3:
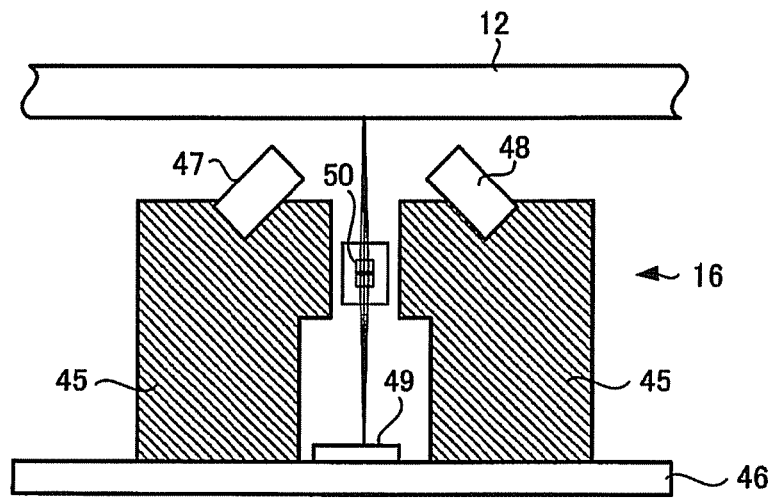
FIG. 3 is a configuration diagram of an image reading device (an image sensor) in the first embodiment.

FIG. 3 is an explanatory diagram of the configuration of the image sensor 16, which is an image reading device. The image sensor 16 reads, according to the operation of the operation panel 14, an image of an original document placed on the document table 12 or an image of an original document fed by the ADF 13. The image sensor 16 is a one-dimensional sensor arranged in the main scanning direction. The image sensor 16 includes a housing 45. The housing 45 is arranged on a substrate 46. On the upper surface of the housing 45 on the document table 12 side, two LED line lighting devices 47 and 48 that irradiate light in the direction of the original document are provided to extend in the main scanning direction (the depth direction in the figure). The LED line lighting devices 47 and 48 include LED arrays and light guide bodies. A light source is not limited to the LEDs and may be a fluorescent tube, a xenon tube, a cold-cathode tube, an organic EL, or the like.

The lens array 50 is supported between the LED line lighting devices 47 and 48 in an upper part of the housing 45. A sensor 49 including a CCD or a CMOS is mounted on the substrate 46 present in the bottom of the housing 45. The LED line lighting devices 47 and 48 irradiate an image reading position for the original document on the document table 12. Light reflected in the image reading position is made incident on the lens array 50. The lens array 50 functions as an erect equal-magnification lens. The light made incident on the lens array 50 is emitted from an emission surface of the lens array 50 and focused on the sensor 49. In other words, the light irradiated by the lighting devices 47 and 48 is transmitted through the lens array 50. The focused light is converted into an electric signal by the sensor 49. The electric signal is transferred to a memory section (not shown in the figure) of the substrate 46.

Figure 4A:
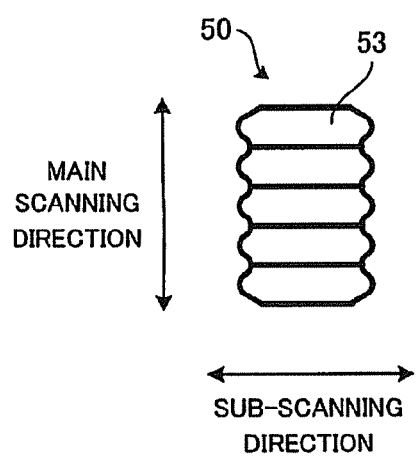
FIG. 4A is a top view of a lens array used in the first embodiment.
Figure 4C:
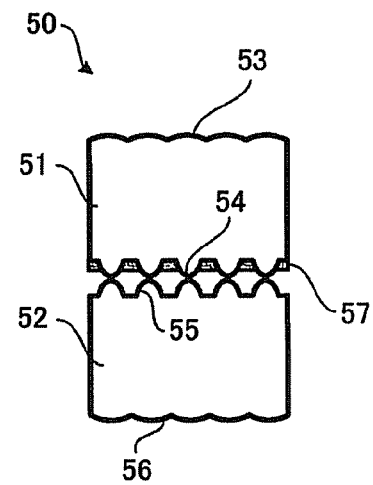
FIG. 4C is a sectional view in a main scanning direction of the lens array.
Figure 4B:
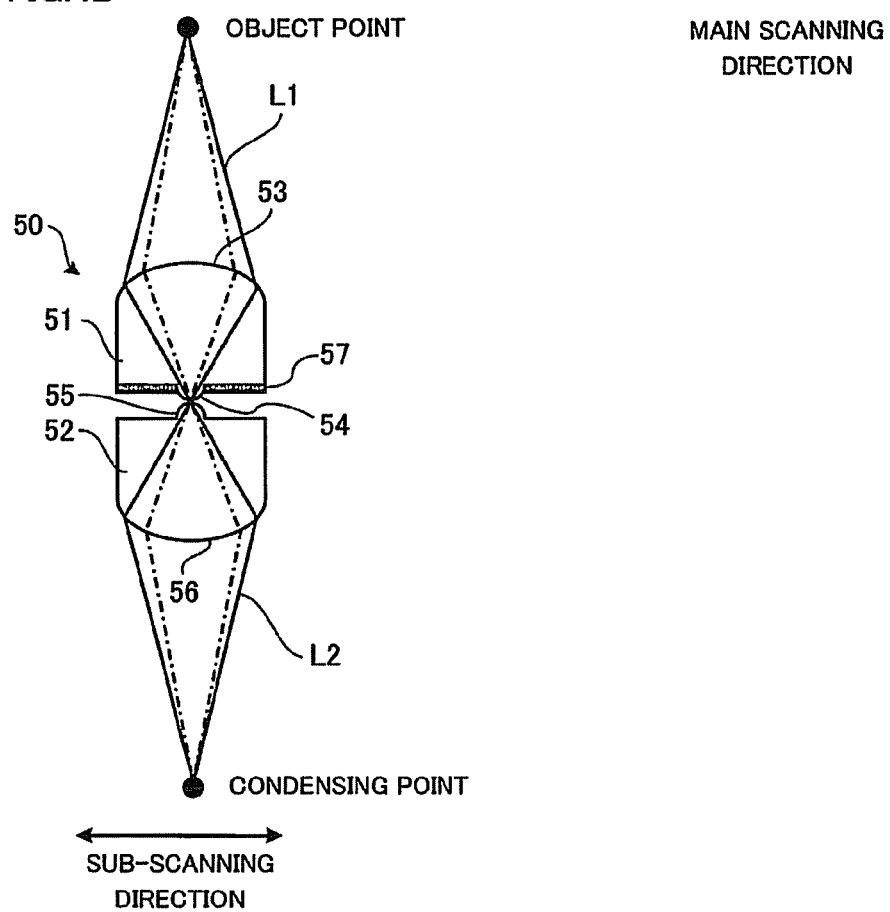
FIG. 4B is a sectional view in a sub-scanning direction of the lens array.

The configuration of the lens array 50 (a focusing element array) is explained. FIG. 4A is a top view of the lens array 50 used in this embodiment. FIG. 4B is a sectional view in the sub-scanning direction of the lens array 50. FIG. 4C is a sectional view in the main scanning direction of the lens array 50.

As shown in FIGS. 4A to 4C, in the lens array 50, a first lens 51 and a second lens 52 having the same shape are arranged to be opposed to each other. The lens array 50 is configured by arranging a plurality of lens elements on incident surfaces and emission surfaces of the lenses 51 and 52 (in the following explanation, the lens elements arranged on an incident surface 53, an emission surface 54, an incident surface 55, and an emission surface 56 and lenses 53, 54, 55, and 56 are used in the same meaning).

The first lens 51 is arrayed in a direction orthogonal to an optical axis. The first lens 51 condenses light (L1) made incident on the incident surface 53 from an object point using a pair of the lens 53 and the lens for each combination of the lens elements of the incident surface and the emission surface of the first lens 51. The second lens 52 is formed in the same shape as the first lens 51. The second lens 52 is arrayed in the direction orthogonal to the optical axis in a state in which the second lens 52 is rotated 180 degrees from the first lens 51 about a straight line extending in the main scanning direction. The lenses (elements) 55 of the second lens 52 are arranged to be respectively opposed to the lenses 54 of the first lens 51 further downstream on an optical path than positions where the lights are respectively condensed by the lenses (elements) 53 and the lenses (elements) 54 of the first lens 51. Lights made incident on the incident surface 55 are condensed again by the emission surface 56.

A light blocking member 57 is provided on the surface of the emission surface 54 of the first lens 51. Apertures (holes) corresponding to combinations of the lens elements of the first lens 51 and the second lens 52 are formed in the light blocking member 57. Light emitted from the emission surface 54 of the first lens 51 is blocked in a portion other than the apertures. Light (L2) obtained by blocking unnecessary light with the light blocking member 57 is focused as an erect equal-magnification image on an image plane passing through the incident surface 55 and the emission surface 56 of the second lens 52 (the lower side in FIG. 4B).

The light blocking member 57 is formed by applying ink around the lenses (elements) 54 of the first lens 51. Alternatively, the light blocking member 57 is obtained by positioning, with respect to the emission surface 54, a sheet-like member provided with apertures (holes) corresponding to the lens elements and bonding the sheet-like member to the emission surface 54.

Figure 5A:
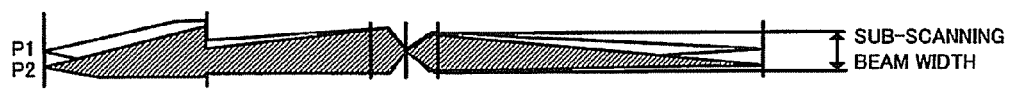
FIG. 5A is a sectional view in the sub-scanning direction of a bundle of light emitted from the lens array after being made incident on the lens array.
Figure 5B:
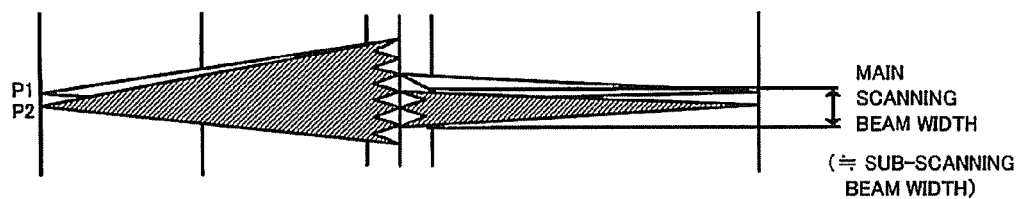
FIG. 5B is a sectional view in the main scanning direction of the bundle of light emitted from the lens array after being made incident on the lens array.

FIG. 5A is a sectional view in the sub-scanning direction of a bundle of light emitted from the lens array 50 after being made incident on the lens array 50 in this embodiment. FIG. 5B is a sectional view in the main scanning direction of the bundle of light. The bundle of light shown in each of FIGS. 5A and 5B is obtained when a ray is emitted from a point P1 on the optical axis and when a ray is emitted from a point P2 at predetermined height. FIGS. 5A and 5B indicate that deviation of the object point from the optical axis and deviation of an image point from the optical axis on the image plane are the same amount in the same direction. This indicates that the lens array 50 functions as an erect equal-magnification optical system in the main scanning direction and the sub-scanning direction.

Figure 6:
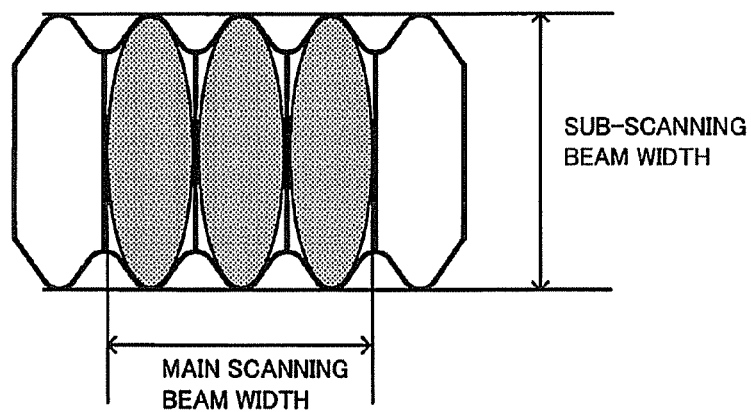
FIG. 6 is an explanatory diagram of the lens array viewed from an image plane side.

FIG. 6 is an explanatory diagram of the lens array 50 viewed from the image plane side in this embodiment. A state of a bundle of light is shown in FIG. 6. In the state of the bundle of light, a state in which light emitted from the object point is emitted from the emission surface 56 of the second lens 52 is viewed from the image plane. Lens width in the sub-scanning direction of the lens elements arranged on the incident surface 53 of the first lens 51 and the emission surface 56 of the second lens 52 is determined such that the widths of the bundle of light in the main scanning direction and the sub-scanning direction are substantially the same.

For example, to suppress light amount unevenness to a practically acceptable level, optical arrangement is set such that light passes through at least three lenses of a lens group in the main scanning direction or, depending on image height in the main scanning direction, two lenses of the lens group. In this case, to set the widths of the bundle of light in the main scanning direction and the sub-scanning direction substantially the same, the lens width in the sub-scanning direction of the lens elements arranged on the incident surface 53 side of the first lens 51 or the emission surface 56 side of the second lens 52 only has to be set to twice to three times as large as a lens pitch in the main scanning direction.

Therefore, according to this embodiment, there are effects explained below.

(1) The distance between two points located on the outermost side of a ray on the emission surface 56 of the second lens 52 in the main scanning direction and the sub-scanning direction in which the ray emitted from the object point is emitted is substantially the same in the main scanning direction and the sub-scanning direction. Therefore, angles of outermost outline light traveling to the image plane with respect to a principal ray can be set the same. Even if the object plane or the image plane deviates from design values, the depths of focus and the depths of field in the sub-scanning direction and the main scanning direction can be set equal. It is possible to prevent a sense of discomfort from being caused to a user who looks at an input image by a CIS and an output image by an LED scanning head.

(2) If optical axes among the lens elements through which one ray passes deviate, a focusing characteristic and a light amount are substantially deteriorated and light amount unevenness worsens in the lens array. Position accuracies of relative positions in the main scanning direction and the sub-scanning direction of the lenses 53 and 54 of the first lens 51 and the lenses 55 and 56 of the second lens 52 depend on accuracy of molds. Therefore, it is possible to accurately set relative position accuracies in the main scanning direction and the sub-scanning direction of the lens elements arranged on the incident surface 53 and the emission surface 54 of the first lens 51 and the lens elements arranged on the incident surface 55 and the emission surface 56 of the second lens 52.

(3) As explained above, the first lens 51 and the second lens 52 have the same shape. The second lens 52 is arranged to be opposed to the first lens 51 in a posture rotated 180 degrees about the axis extending in the main scanning direction. Therefore, even if absolute position accuracy of the lens elements (53, 54, 55, and 56) is not secured, the lenses (elements) on the first lens 51 and the lenses (elements) on the second lens 52 deviate in the same manner. Consequently, it is possible to arrange the optical axes of the lens elements arranged on the incident surface 53 and the emission surface 54 of the first lens 51 and the incident surface 55 and the emission surface 56 of the second lens 52 in the main scanning direction and the sub-scanning direction without relative position deviation.

(4) The outer periphery of the incident surface 53 of the first lens 51 is not formed linear and is formed in a curved surface shape to minimize the light amount unevenness. Since the entire surface is formed as a lens surface, unnecessary light is prevented from entering the incident surface 53.

(5) Only one light blocking member 57 is provided. Therefore, among lights passed through the incident surface 53 of the first lens 51, all the lights (L2) passed through the light blocking member 57 provided on the emission surface 54 side reach the image plane. Therefore, even if the first lens 51 and the second lens 52 are arranged eccentrically, light blocking by other light blocking members does not occur. Consequently, it is possible to suppress a light amount loss and an amount of worsening of light amount unevenness.

Second Embodiment

Figure 7A:
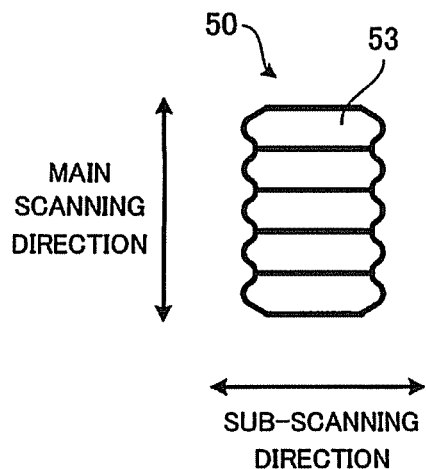
FIG. 7A is a top view of a lens array used in a second embodiment.
Figure 7C:
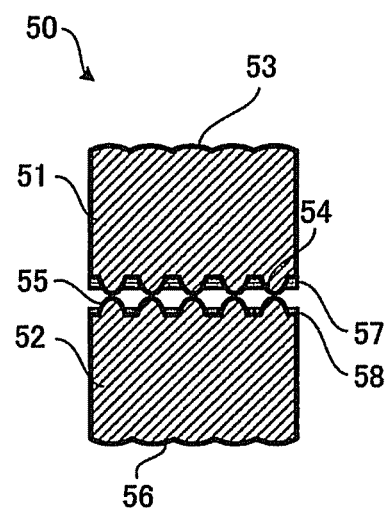
FIG. 7C is a sectional view in the main scanning direction of the lens array.
Figure 7B:
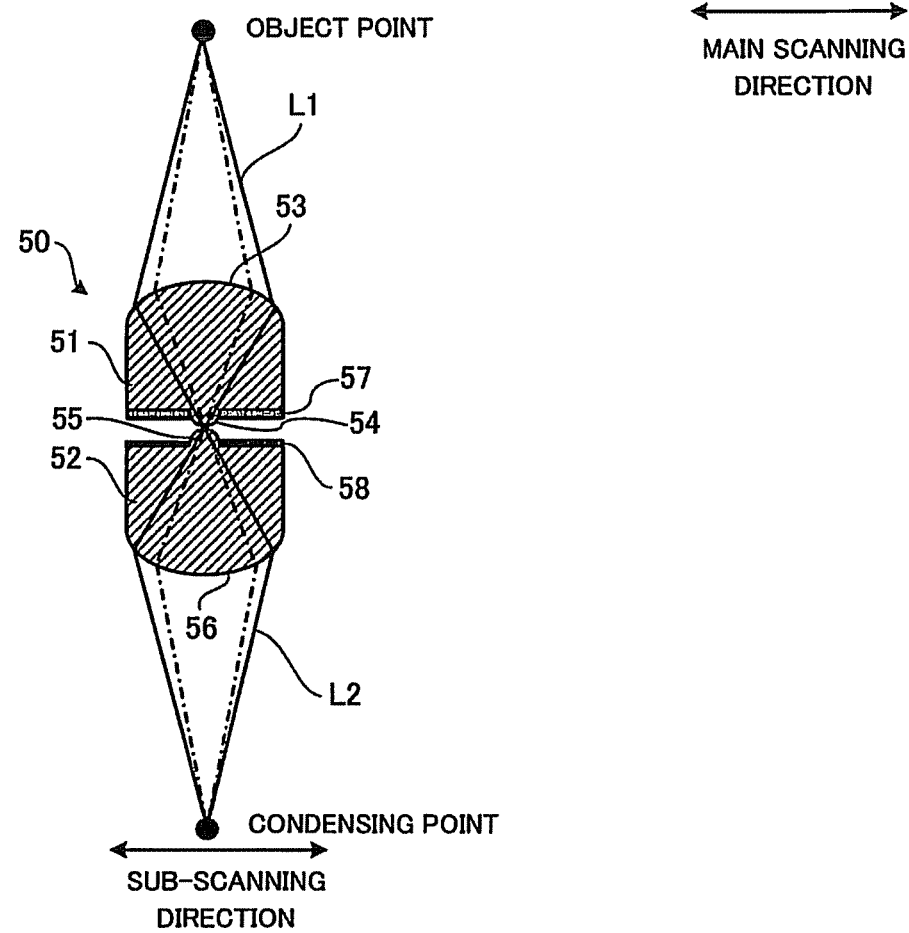
FIG. 7B is a sectional view in the sub-scanning direction of the lens array.

FIG. 7A is a top view of the lens array 50 used in a second embodiment. FIG. 7B is a sectional view in the sub-scanning direction of the lens array 50. FIG. 7C is a sectional view in the main scanning direction of the lens array 50.

As shown in FIGS. 7A to 7C, the lens array 50 in this embodiment is different from the lens array 50 in the first embodiment in that a light blocking member 58 is provided on the surface of the incident surface 55 of the second lens 52. The diameter of apertures formed in the light blocking member 58 on the incident surface 55 side of the second lens 52 is formed larger than the diameter of the apertures formed in the light blocking member 57 on the emission surface 54 side of the first lens 51. Like the light blocking member 57, the light blocking member 58 is formed by applying ink around the lenses 55 of the second lens 52. Alternatively, the light blocking member 58 is obtained by positioning, with respect to the incident surface 55, a sheet-like member provided with apertures (holes) and bonding the sheet-like member to the incident surface 55. When an erect equal-magnification image is formed, all the lens elements are convex lenses. When it is assumed that the vertexes of the convex lenses face up, an aperture diameter is smaller as the upper surface of the ink is closer to the vertexes of the lenses. Since the first lens 51 and the second lens 52 have the same shape, the distances from the vertexes to the bottom surfaces of the lens elements are the same. Making use of the fact that the distances are the same, when the ink is applied, ink thickness on the incident surface 55 side of the second lens 52 is set smaller than ink thickness on the emission surface 54 side of the first lens 51 (the ink upper surface is separated from the lens vertexes) to set the diameter of the apertures formed in the light blocking member 58 relatively large.

Therefore, according to this embodiment, in addition to effects same as the effects (1), (2), (3), and (4) in the first embodiment, there are effects explained below. Even if the first lens 51 and the second lens 52 are arranged eccentrically, it is determined in the light blocking member 57 on the emission surface 54 side of the first lens 51 which beam is allowed to pass. In the light blocking member 58 on the incident surface 55 side of the second lens 52, since the first lens 51 and the second lens 52 are arranged eccentrically, it is possible to cut stray light caused by a ray entering a lens element adjacent to a regular lens element that the ray should enter on the incident surface 53 of the second lens 52 if the first lens 51 and the second lens 52 are not arranged eccentrically. Further, even if the first lens 51 and the second lens 52 are arranged eccentrically in the main scanning direction and the sub-scanning direction, a ray is not blocked at an eccentricity up to a radius difference among the apertures.

Third Embodiment

Figure 8A:
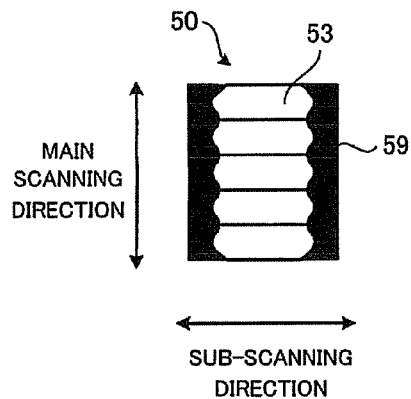
FIG. 8A is a top view of a lens array used in a third embodiment.
Figure 8C:
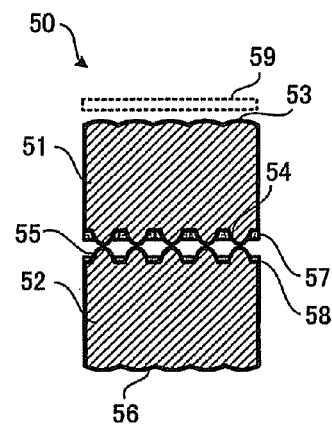
FIG. 8C is a sectional view in the main scanning direction of the lens array.
Figure 8B:
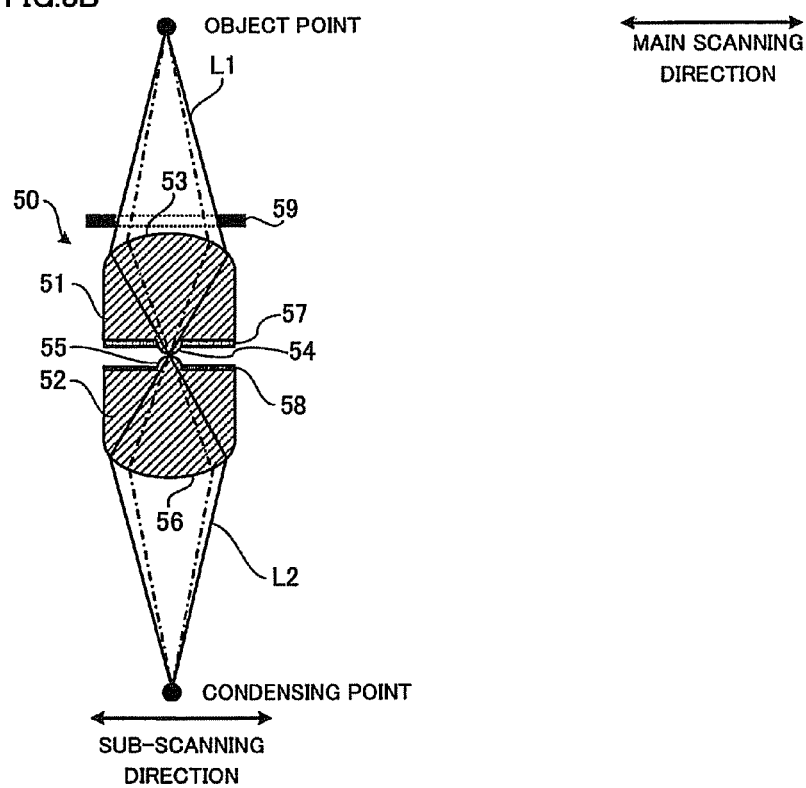
FIG. 8B is a sectional view in the sub-scanning direction of the lens array.

FIG. 8A is a top view of the lens array 50 used in a third embodiment. FIG. 8B is a sectional view in the sub-scanning direction of the lens array 50. FIG. 8C is a sectional view in the main scanning direction of the lens array 50.

As shown in FIGS. 8A to 8C, the lens array 50 in this embodiment is different from the lens array 50 in the second embodiment in that a light blocking member 59 is provided spaced apart from the incident surface 53 on the object point side, i.e., in the vicinity of the incident surface 53 of the first lens 51. In the light blocking member 59, a slit, the width in the sub-scanning direction of which changes at a lens array pitch period on the incident surface 53 of the first lens 51, is formed. Since the light blocking member 59 is in no contact with the incident surface 53 of the first lens 51, the light blocking member 59 is suitably formed by being sliced out from a sheet-like member.

In this embodiment, the light blocking member 59 having the slit is provided. The width of the slit is determined such that, when light emitted from the object point is emitted from the emission surface 56 of the second lens 52, the widths of the bundle of light in the main scanning direction and the sub-scanning direction are substantially the same as shown in FIGS. 5A and 5B. The widths of the bundle of light in the main scanning direction and the sub-scanning direction may be set substantially the same by providing a light blocking member having a slit on the emission surface 56 side of the second lens 52 and adjusting the width of the slit.

For example, to suppress light amount unevenness to a practically acceptable level, as in the first embodiment, optical arrangement is set such that light passes through at least three lenses of a lens group in the main scanning direction or, depending on object height in the main scanning direction, two lenses of the lens group. In this case, to set the widths of the bundle of light in the main scanning direction and the sub-scanning direction substantially the same, the slit width in the sub-scanning direction only has to be set to twice to three times as large as a lens pitch in the main scanning direction.

Therefore, according to this embodiment, there are effects explained below in addition to effects same as the effects in the second embodiment.

(1) It is possible to cut, at an end in the sub-scanning direction of the lenses 53 of the first lens 51, stray light that occurs in a lens edge section.

(2) It is possible to form the lens array 50 in which, even after the lens widths of the first lens 51 and the second lens 52 are adjusted in advance, a blur of an output image is reduced by adjusting the widths of the bundle of light in the main scanning direction and the sub-scanning direction and the slit width.

Fourth Embodiment

Figure 9A:
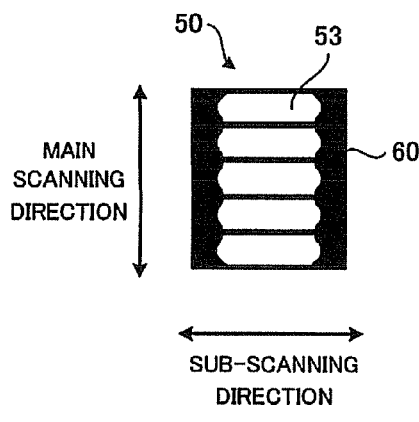
FIG. 9A is a top view of a lens array used in a fourth embodiment.
Figure 9C:
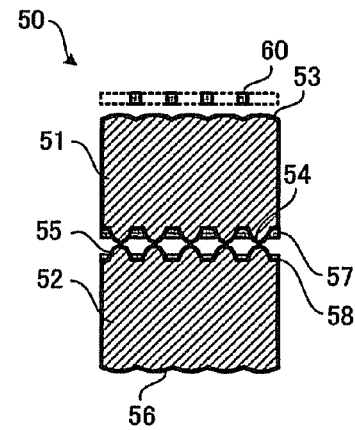
FIG. 9C is a sectional view in the main scanning direction of the lens array.
Figure 9B:
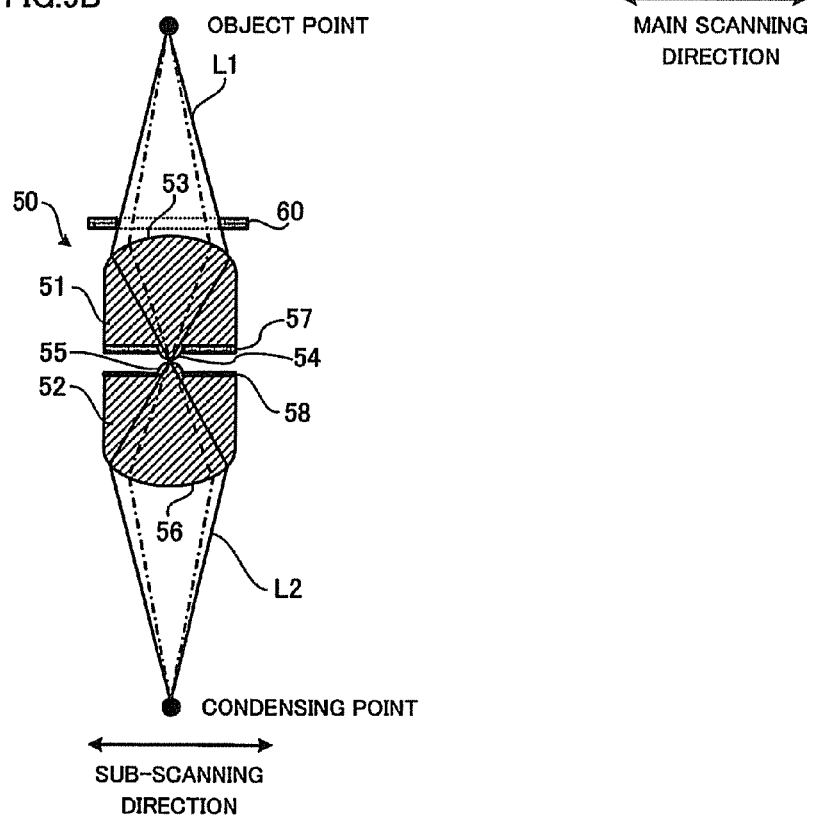
FIG. 9B is a sectional view in the sub-scanning direction of the lens array.

FIG. 9A is a top view of the lens array 50 used in a fourth embodiment. FIG. 9B is a sectional view in the sub-scanning direction of the lens array 50. FIG. 9C is a sectional view in the main scanning direction of the lens array 50.

As shown in FIGS. 9A to 9C, the lens array 50 in this embodiment is different from the lens array 50 in the third embodiment in the shape of a light blocking member 60 provided in the vicinity of the incident surface 53 of the first lens 51. Specifically, the light blocking member 60 in the vicinity of the incident surface 53 of the first lens 51 includes a slit section, the width in the sub-scanning direction of which changes at a lens array pitch period on the incident surface 53, and a boundary light blocking section that blocks light made incident on boundaries among the lens elements on the incident surface 53 of the first lens 51 from the object point.

Therefore, according to this embodiment, in addition to effects same as the effects in the third embodiment, there are an effect that it is possible to further cut stray light made incident on the boundaries among the lens elements arranged on the incident surface 53 of the first lens 51.

Fifth Embodiment

Figure 10A:
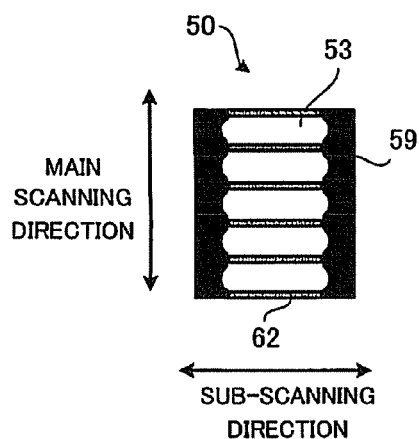
FIG. 10A is a top view of a lens array used in a fifth embodiment.
Figure 10C:
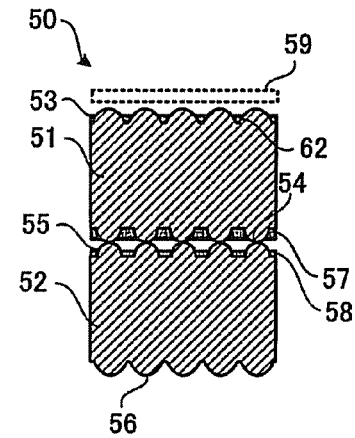
FIG. 10C is a sectional view in the main scanning direction of the lens array.
Figure 10B:
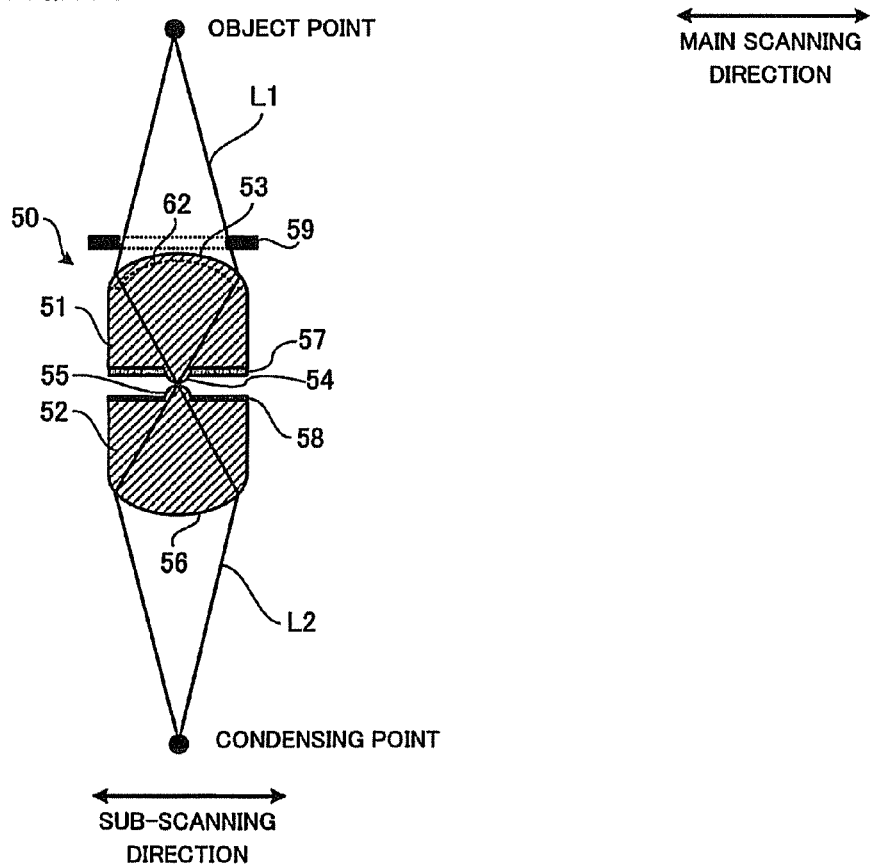
FIG. 10B is a sectional view in the sub-scanning direction of the lens array.

FIG. 10A is a top view of the lens array 50 used in a fifth embodiment. FIG. 10B is a sectional view in the sub-scanning direction of the lens array 50. FIG. 10C is a sectional view in the main scanning direction of the lens array 50. As shown in FIGS. 10A to 10C, as in the fourth embodiment, a light blocking member 62 is provided in boundaries among the lenses 53 on the surface of the incident surface 53 of the first lens 51. Further, the light blocking member 59 having a slit is provided on the object point side spaced apart from the incident surface 53. The light blocking member 62 is provided only in the boundaries among the lens elements by application of ink in order to cut light made incident on the boundaries among the lens elements on the incident surface 53 of the first lens 51.

Modification

Figure 11A:
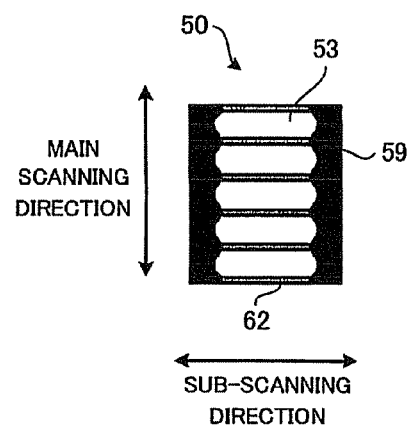
FIG. 11A is a top view of a lens array used in a modification of the fifth embodiment.
Figure 11C:
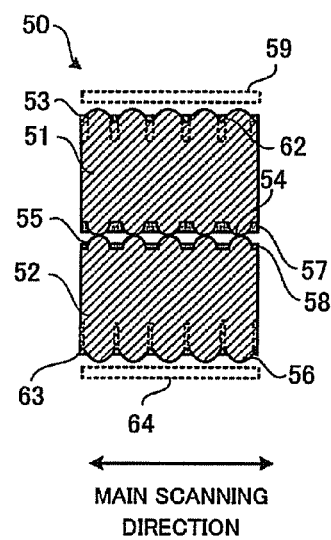
FIG. 11C is a sectional view in the main scanning direction of the lens array.
Figure 11B:
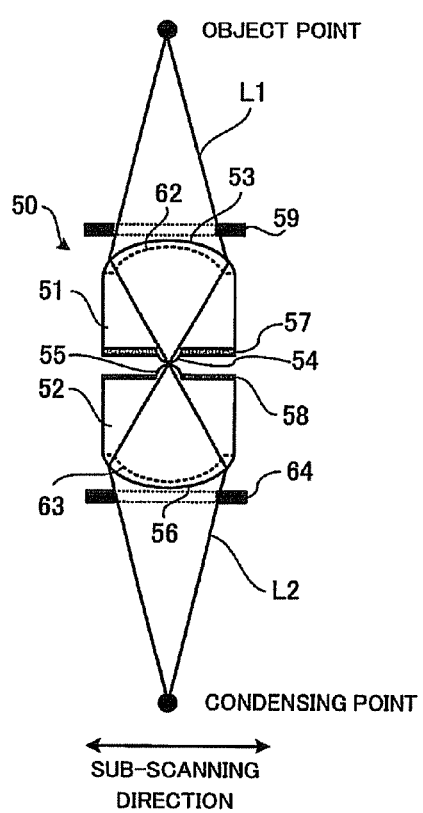
FIG. 11B is a sectional view in the sub-scanning direction of the lens array.
Figure 11D:
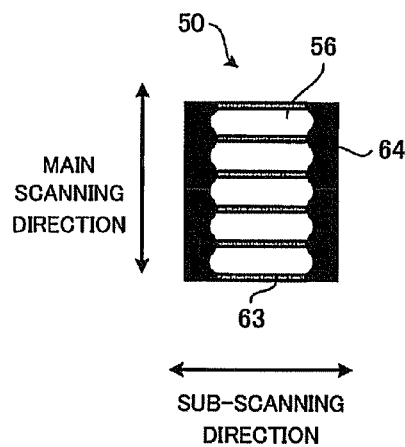
FIG. 11D is a bottom view of the lens array.

FIG. 11A is a top view of the lens array 50 used in a modification of the fifth embodiment. FIG. 11B is a sectional view in the sub-scanning direction of the lens array 50. FIG. 11C is a sectional view in the main scanning direction of the lens array 50. FIG. 11D is a bottom view of the lens array 50. As shown in FIGS. 11A to 11D, compared with the lens array 50 shown in FIGS. 10A to 10C, a light blocking member 63 is added in boundaries among the lenses 56 on the surface of the emission surface 56 of the second lens 52. The light blocking member 63 is provided only in the boundaries among the lenses 56 by application of ink. Since the light blocking member 63 is provided, there is an effect that it is possible to prevent light, which enters another lens element adjacent to a regular lens element on the emission surface 56 of the second lens 52, from traveling in the direction of the image plane. Further, like that light blocking member 59 on the incident surface 53 side of the first lens 51, a light blocking member 64 having a slit is provided in the vicinity of the emission surface 56 of the second lens 52. The ability of reducing stray light is intensified. In this case, the width of a ray on the emission surface 56 on the sub-scanning direction can be determined by the opening width of the slit of the light blocking member 59 or the slit of the light blocking member 64.

While certain embodiments have been described these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A lens array comprising:
   a first lens including a plurality of lens elements arrayed in a row in a main scanning direction orthogonal to an optical axis of the first lens and configured to condense, with an emission surface, light made incident on an incident surface from an object point; and
   a second lens formed in a same shape as the first lens and including a plurality of lens elements arrayed in a row in the main scanning direction, an incident surface of the lens elements of the second lens being arranged on an optical path near a position where the light is condensed by the lens elements of the first lens, and the lens elements of the second lens condensing again, with an emission surface, light made incident on the incident surface, wherein
   the lens array is formed such that width in a sub-scanning direction, which is orthogonal to the main scanning direction and the optical axis of the first lens, of the lens elements arranged on the incident surface of the first lens and the emission surface of the second lens is larger than a lens pitch in the main scanning direction and, when the light from the object point is made incident on the incident surface of the first lens and emitted from the emission surface of the second lens, a distance between two points of emission positions on outermost sides on the emission surface of the second lens is substantially same in the main scanning direction and the sub-scanning direction.

2. The lens array according to claim 1, further comprising a light blocking member including apertures formed to correspond to the lens elements of the first lens and the second lens, arranged at least between the emission surface of the first lens and the incident surface of the second lens, and configured to block incident or emitted light in a portion other than the apertures.

3. The lens array according to claim 2, wherein the light blocking member is provided only on a surface of the emission surface of the first lens.

4. The lens array according to claim 2, wherein
a pair of the light blocking members are provided to correspond to the emission surface of the first lens and the incident surface of the second lens, and
a diameter of the apertures formed in the light blocking member on the incident surface side of the second lens is larger than a diameter of the apertures formed in the light blocking member on the emission side of the first lens.

5. The lens array according to claim 2, wherein
a plurality of the light blocking members are provided to correspond to the incident surface and the emission surface of the first lens and the incident surface of the second lens, and
a slit, width of which in the sub-scanning direction changes at a lens array pitch period on the incident surface of the first lens, is formed in the light blocking member on the incident surface side of the first lens.

6. The lens array according to claim 4, wherein
the light blocking member is ink applied to a surface of the first lens or a second lens, and
the diameter of the aperture is determined by changing thickness of the ink for each of the incident surface and the emission surface to which the ink correspond.

7. The lens array according to claim 1, wherein an outer peripheral shape of the incident surface of the first lens and the emission surface of the second lens are nonlinear.

8. The lens array according to claim 1, wherein the width of the lens elements in the sub-scanning direction of the incident surface of the first lens and the emission surface of the second lens is length about twice to three times as large as a lens array pitch in the main scanning direction.

9. The lens array according to claim 1, further comprising a light blocking member provided in a vicinity of the incident surface of the first lens and the emission surface of the second lens including a slit formed to limit beam width in the sub-scanning direction, wherein
width of the slit in the sub-scanning direction of the first and second lenses is length about twice to three times as large as a lens array pitch in the main scanning direction.

10. The lens array according to claim 1, wherein the optical axis in a state in which the second lens is rotated 180 degrees from the first lens about a rotation center axis in the main scanning direction.

11. An image forming apparatus comprising:
a lighting device provided in a main scanning direction of an original document and configured to irradiate light to an image reading position for the original document on a document table;
a lens array including:
a first lens including a first lens and a second lens, the first lens including a plurality of lens elements arrayed in a row in the main scanning direction and being configured to condense, with an emission surface, the light made incident on an incident surface from the image reading position of the original document, the second lens being formed in a same shape as the first lens and including a plurality of lens elements arrayed in a row in the main scanning direction, an incident surface of the lens elements of the second lens being arranged on an optical path near a position where the light is condensed by the lens elements of the first lens, and the lens elements condensing again, with an emission surface, light made incident on the incident surface; and
a sensor arrayed in the main scanning direction and configured to convert the light which is focused by the lens array into an electric signal;
wherein the lens array being formed such that width in a sub-scanning direction, which is orthogonal to the main scanning direction and an optical axis of the first lens, of the lens elements arranged on the incident surface of the first lens and the emission surface of the second lens is larger than a lens pitch in the main scanning direction and, when the light from the object point is made incident on the incident surface of the first lens and emitted from the emission surface of the second lens, a distance between two points of emission positions on outermost sides on the emission surface of the second lens is substantially same in the main scanning direction and the sub-scanning direction.

12. The image forming apparatus according to claim 11, further comprising a light blocking member including apertures formed to correspond to the lens elements of the first lens and the second lens, arranged at least between the emission surface of the first lens and the incident surface of the second lens, and configured to block incident or emitted light in a portion other than the apertures.

13. The image forming apparatus according to claim 12, wherein the light blocking member is provided only on a surface of the emission surface of the first lens.

14. The image forming apparatus according to claim 12, wherein
a pair of the light blocking members are provided to correspond to the emission surface of the first lens and the incident surface of the second lens, and
a diameter of the apertures formed in the light blocking member on the incident surface side of the second lens is larger than a diameter of the apertures formed in the light blocking member on the emission side of the first lens.

15. The image forming apparatus according to claim 14, wherein
the light blocking member is ink applied to a surface of the first lens or a second lens, and
the diameter of the aperture is determined by changing thickness of the ink for each of the incident surface and the emission surface to which the ink correspond.

16. The image forming apparatus according to claim 12, wherein
a plurality of the light blocking members are provided to correspond to the incident surface and the emission surface of the first lens and the incident surface of the second lens, and
a slit, width of which in the sub-scanning direction changes at a lens array pitch period on the incident surface of the first lens, is formed in the light blocking member on the incident surface side of the first lens.

17. The image forming apparatus according to claim 11, wherein an outer peripheral shape of the incident surface of the first lens and the emission surface of the second lens are nonlinear.

18. The image forming apparatus according to claim 11, wherein the width of the lens elements in the sub-scanning direction of the incident surface of the first lens and the emission surface of the second lens is length about twice to three times as large as a lens array pitch in the main scanning direction.

19. The image forming apparatus according to claim 11, further comprising a light blocking member provided in a vicinity of the incident surface of the first lens and the emission surface of the second lens including a slit formed to limit beam width in the sub-scanning direction, wherein width of the slit in the sub-scanning direction of the first and second lenses is length about twice to three times as large as a lens array pitch in the main scanning direction.

20. The image forming apparatus according to claim 11, wherein the optical axis in a state in which the second lens is rotated 180 degrees from the first lens about a rotation center axis in the main scanning direction.

* * * * *